US008471842B2

(12) United States Patent
Ha

(10) Patent No.: US 8,471,842 B2
(45) **Date of Patent: *Jun. 25, 2013**

(54) LIQUID CRYSTAL DISPLAY DEVICE AND METHOD FOR DRIVING THE SAME

(75) Inventor: Yong Min Ha, Kyongsangbuk-do (KR)

(73) Assignee: LG Display Co., Ltd., Seoul (KR)

( * ) Notice: Subject to any disclaimer, the term of this patent is extended or adjusted under 35 U.S.C. 154(b) by 1356 days.

This patent is subject to a terminal disclaimer.

(21) Appl. No.: 10/910,351

(22) Filed: Aug. 4, 2004

(65) Prior Publication Data

US 2005/0001800 A1 Jan. 6, 2005

Related U.S. Application Data

(63) Continuation of application No. 09/894,908, filed on Jun. 29, 2001, now Pat. No. 6,847,344.

(30) Foreign Application Priority Data

Aug. 30, 2000 (KR) ............................ 10-2000-50770

(51) Int. Cl.

*G06F 3/038* (2006.01)
*G09G 5/00* (2006.01)
*G09G 3/36* (2006.01)
*G02F 1/133* (2006.01)

(52) U.S. Cl.

USPC ............. 345/215; 345/204; 345/214; 345/87; 345/98; 345/99; 345/100; 349/33; 349/34

(58) Field of Classification Search

USPC .................. 345/87–90, 92–96, 98–100, 103, 345/204–206, 208–210, 214, 215, 690, 694; 349/33, 34, 36, 37, 41, 42

See application file for complete search history.

(56) References Cited

U.S. PATENT DOCUMENTS

| | | | | |
|---|---|---|---|---|
| 5,426,447 | A | 6/1995 | Lee | |
| 5,510,807 | A * | 4/1996 | Lee et al. | 345/103 |
| 5,555,001 | A * | 9/1996 | Lee et al. | 345/93 |
| 5,648,793 | A | 7/1997 | Chen | |
| 5,686,936 | A | 11/1997 | Maekawa et al. | |
| 5,764,207 | A | 6/1998 | Maekawa et al. | |
| 5,892,493 | A * | 4/1999 | Enami et al. | 345/94 |
| 5,959,600 | A * | 9/1999 | Uchino et al. | 345/94 |
| 6,211,851 | B1 | 4/2001 | Lien et al. | |
| 6,232,948 | B1 * | 5/2001 | Tsuchi | 345/99 |
| 6,266,039 | B1 | 7/2001 | Aoki | |
| 6,307,681 | B1 | 10/2001 | Aoki et al. | |
| 6,342,881 | B1 * | 1/2002 | Inoue | 345/204 |
| 6,356,253 | B2 | 3/2002 | Uchino et al. | |

(Continued)

FOREIGN PATENT DOCUMENTS

KR 2000-0018581 4/2000

*Primary Examiner* — Bipin Shalwala
*Assistant Examiner* — Ilana Spar
(74) *Attorney, Agent, or Firm* — Morgan, Lewis & Bockius LLP

(57) ABSTRACT

A liquid crystal display (LCD) device having a first substrate and a second substrate with liquid crystal sealed therebetween, includes a plurality of gate lines and data lines crossing each other on the first substrate; a gate driving section for driving the gate lines; a source driving section for precharging the data lines for a first time and supplying video signals to the data lines; and a precharge circuit section for precharging the data lines for a second time.

3 Claims, 10 Drawing Sheets

U.S. PATENT DOCUMENTS 6,359,608 B1 3/2002 Lebrun et al.
6,483,494 B1 * 11/2002 Liaw et al. ...................... 345/92
6,529,180 B1 * 3/2003 Ito et al. .......................... 345/89
6,542,142 B2 * 4/2003 Yumoto et al. .................. 345/90
6,700,562 B1 3/2004 Knapp et al.
6,731,266 B1 5/2004 Jung

* cited by examiner

LIQUID CRYSTAL DISPLAY DEVICE AND METHOD FOR DRIVING THE SAME

This is a continuation of application Ser. No. 09/894,908, filed on Jun. 29, 2001 now U.S. Pat. No. 6,847,344.

The present invention claims the benefit of Korean Patent Application No. P 2000-50770 filed in Korea on Aug. 30, 2000, which is hereby incorporated by reference.

BACKGROUND OF THE INVENTION

1. Field of the Invention

The present invention relates to a flat display device, and in particular, to a liquid crystal display (LCD) device and a method for driving the same with enhanced screen quality and reduced cross-talk effect.

2. Description of the Related Art

In general, an LCD device is manufactured by facing two glass substrates (also called top and bottom plates) and injecting liquid crystal in the space between the two glass substrates. A data line and a gate line are arranged in a matrix form at the bottom plate to define a plurality of pixel regions. A thin film transistor and a pixel electrode are aligned in each pixel region.

Provided at the top plate are a common electrode for applying a common voltage to the liquid crystal, and a color filter layer for expressing colors of red, green and blue (R, G, B).

The following is a detailed description of various components formed on the bottom plate and the top plate.

As shown in FIG. 1, a plurality of gate lines 12 are formed on a transparent substrate 11 made of glass or quartz, and a plurality of data lines 13 are formed in a direction crossing the gate lines 12. A pixel region is defined by each data line 13 and gate line 12. A pixel electrode is aligned in the pixel region, and a thin film transistor is formed at a point where the data line 13 crosses the gate line 12.

A black matrix layer 14 is formed in a net shape on a transparent substrate 11*a* for shielding penetration of light to various portions of the device except the pixel electrode formed on the bottom plate. A color filter layer 15 is formed between each black matrix to express colors. A common electrode 16 is formed throughout the surface of the transparent substrate 11*a* including the color filter layer 15 and the black matrix layer 14.

The following is a description of a conventional LCD device made with reference to the accompanying drawings.

FIG. 2 is a diagram illustrating a panel structure of a conventional LCD device, in which a driving circuit section is integrated with a pixel section.

Referring to FIG. 2, the conventional LCD device includes a pixel section 21 having a plurality of gate lines and a plurality of data lines arranged to cross each other and a plurality of pixels having thin film transistors and liquid crystal capacitors formed at each crossing point. A gate driving circuit section 23 applies driving signals to the gate lines in order. A source driving circuit section 25 including a plurality of data line sets applies video signals to each set of data lines. A precharge circuit section 27 precharges the data lines.

The precharge circuit section 27 includes a switching section 27*a* composed of a precharging voltage terminal Vp and transistors for connecting each data line. The data lines are precharged a predetermined level by means of precharge control signals Cp applied to the transistor gates.

The source driving circuit section 25 includes a plurality of data line sets, each set being composed of n number of data lines. Video signal lines S1, S2, . . . , Sn are connected to each set of data lines so that the video signals are applied to the corresponding set of data lines by means of n number of control signals C1, C2, . . . , Cn.

A driving method of the conventional LCD device constructed as discussed above will now be described with reference to FIG. 3 illustrating a driving waveform.

If a gate driving signal is applied as shown in FIG. 3, the precharge circuit section 27 precharges each data line to a predetermined level with an intermediate voltage between a positive field and a negative field of the video signals.

Thereafter, each set of data lines of the source driving circuit section 25 is activated, thereby applying the video signals to the data lines. Here, the control signals C1, C2, . . . , Cn are activated in order. When the control signals C1 is activated, the other control signals C2, C3, . . . , Cn remain inactive. When C1 becomes inactive, the control signal C2 changes to an active state.

Each set of data lines become active through the above process, and video signals are thus applied to the corresponding data lines.

Assuming that the video signals in a positive field have a voltage range of about 6-10V and the video signals in a negative field have a voltage range of about 1-5V, the data lines are precharged to a voltage level of about 5.5V.

When the control signal C1 changes to an inactive state and the control signal C2 changes to an active state after the corresponding data lines are applied with video signals, a parasitic capacitance is generated because the video signals are applied to the data lines in order.

The parasitic capacitance causes distortion of the video signals applied to the data lines. Therefore, if the control signals Cn become active, the video signals applied to the corresponding data line are significantly distorted.

Such a distortion of the video signals is attributable to the parasitic capacitance generated between the two data lines adjacent to a given liquid crystal capacitor. Thus, it is crucial to reduce the parasitic capacitance. However, reduction of the parasitic capacitance has a limit as it is closely related to an aperture rate. This effect will now be described with reference to FIG. 4.

FIG. 4 is a diagram illustrating the generation of the parasitic capacitance between two adjacent data line and a liquid crystal capacitor between them in the conventional LCD device and the driving method.

Referring to FIG. 4, a capacitance is generated between the data lines adjacent to the liquid crystal capacitor within a pixel. To be specific, if a video signal is applied to an $m^{th}$ data line D_m and then to an $m+1^{th}$ data line D_m+1, a coupling is generated due to a parasitic capacitance $C_{dpm}$ between the liquid crystal capacitor $C_{LC}$ and the $m^{th}$ data line. The coupling is also generated due to a parasitic capacitance $C_{dpm+1}$ between the liquid crystal capacitor $C_{LC}$ and the $m+1^{th}$ data line.

Thus, the conventional LCD device and its associated driving method described above pose a problem by generating a coupling, which is attributable to a parasitic capacitance between a liquid crystal capacitor and adjacent data lines due to the video signals applied to the data lines consecutively.

The coupling is shown in the form of a vertical cross talk. In other words, when there is a difference in a screen pattern, a value of the liquid crystal capacitor is changed and the coupling voltage is changed due to the parasitic capacitance, thereby reducing the screen display quality.

SUMMARY OF THE INVENTION

Accordingly, the present invention is directed to an improved liquid crystal display device and method for driving the same that substantially obviate one or more of the problems due to limitations and disadvantages of the related art.

An object of the present invention is to provide an LCD device and a method for driving the same that can improve the screen display quality and reduce cross talks by preventing the signal coupling between data lines.

Additional features and advantages of the invention will be set forth in the description which follows, and in part will be apparent from the description, or maybe learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the liquid crystal display device having a first substrate and a second substrate with liquid crystal sealed therebetween, includes: a plurality of gate lines and data lines crossing each other on the first substrate; a gate driving section for driving the gate lines; a source driving section for precharging the data lines for a first time and supplying video signals to the data lines; and a precharge circuit section for precharging the data lines for a second time.

In another aspect, a method for driving the LCD device and precharging data lines, includes: a first step of precharging the data lines by shortening all data lines and applying a first precharging voltage; and a second step of precharging the data lines by alternately applying precharging voltages lower and higher than the first precharged voltage to each data line whenever horizontal scan lines are activated.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

In the following description, functions or constructions well known to those skilled in the art are not described in detail since they would obscure the invention in unnecessary detail.

First Embodiment

Figure 1:
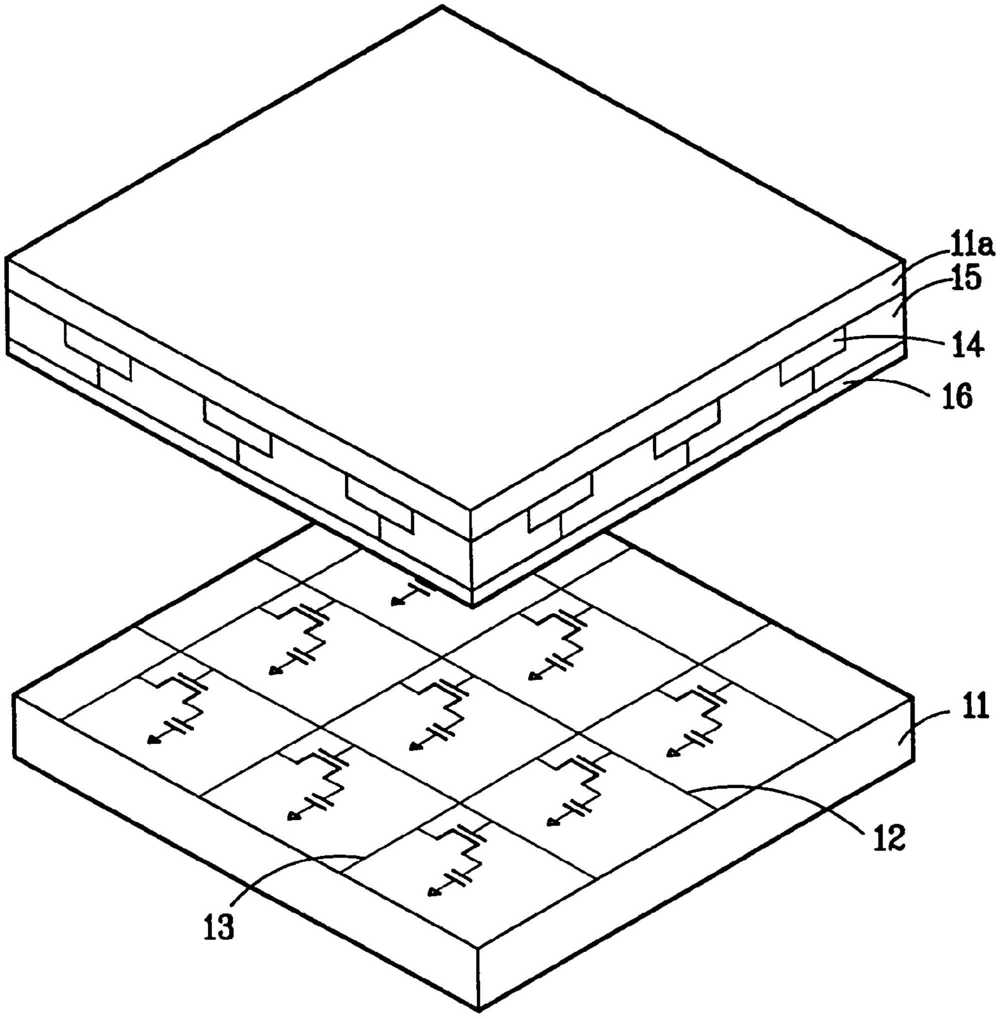
FIG.1 Related Art
FIG. 1 is a block diagram illustrating a construction of an LCD device in general.
Figure 2:
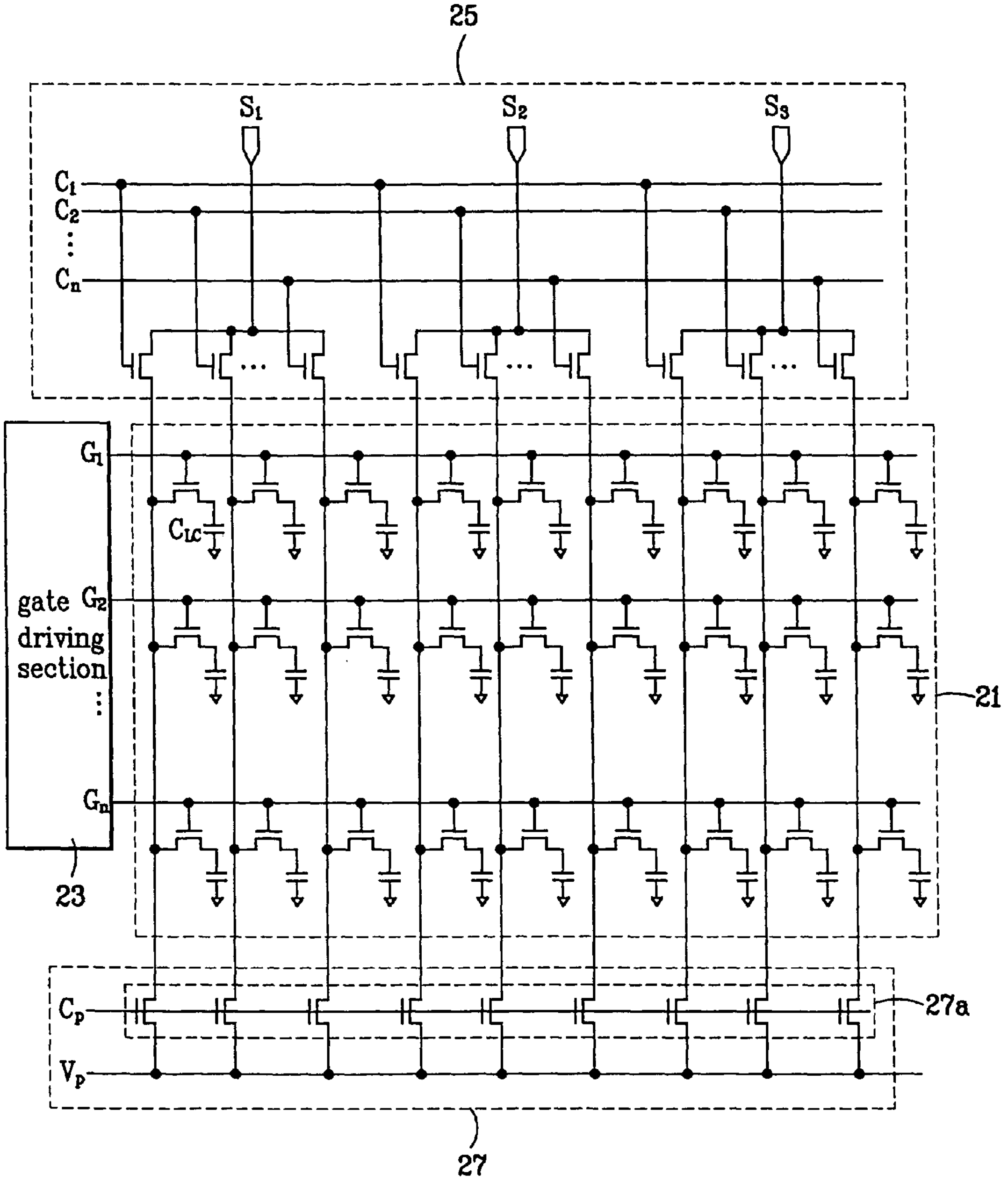
FIG. 2 Related Art
FIG. 2 is a block diagram illustrating a construction of a panel of a conventional LCD device.
Figure 3:
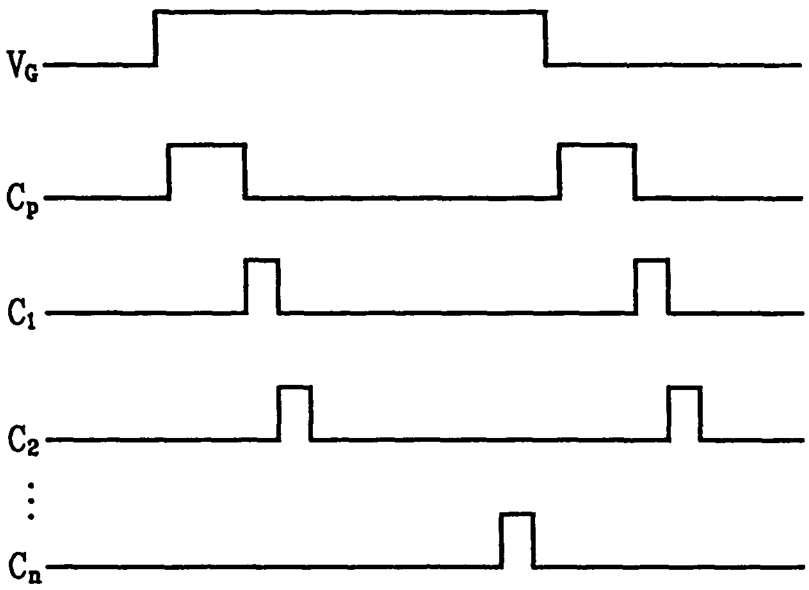
FIG. 3 Related Art
FIG. 3 is a driving waveform illustrating a driving method of the conventional LCD device.
Figure 4:
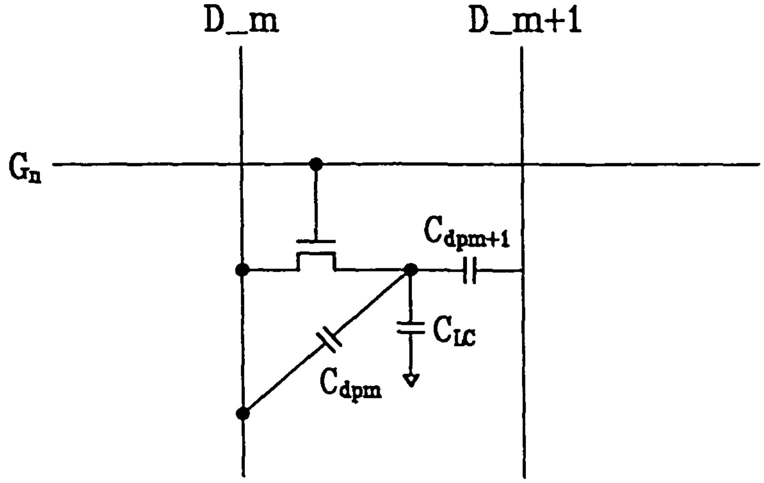
FIG. 4 Related Art
FIG. 4 is a diagram illustrating the conventional LCD device and generation of a parasitic capacitance between data lines and a liquid crystal capacitor according to the method for driving the conventional LCD device.
Figure 5:
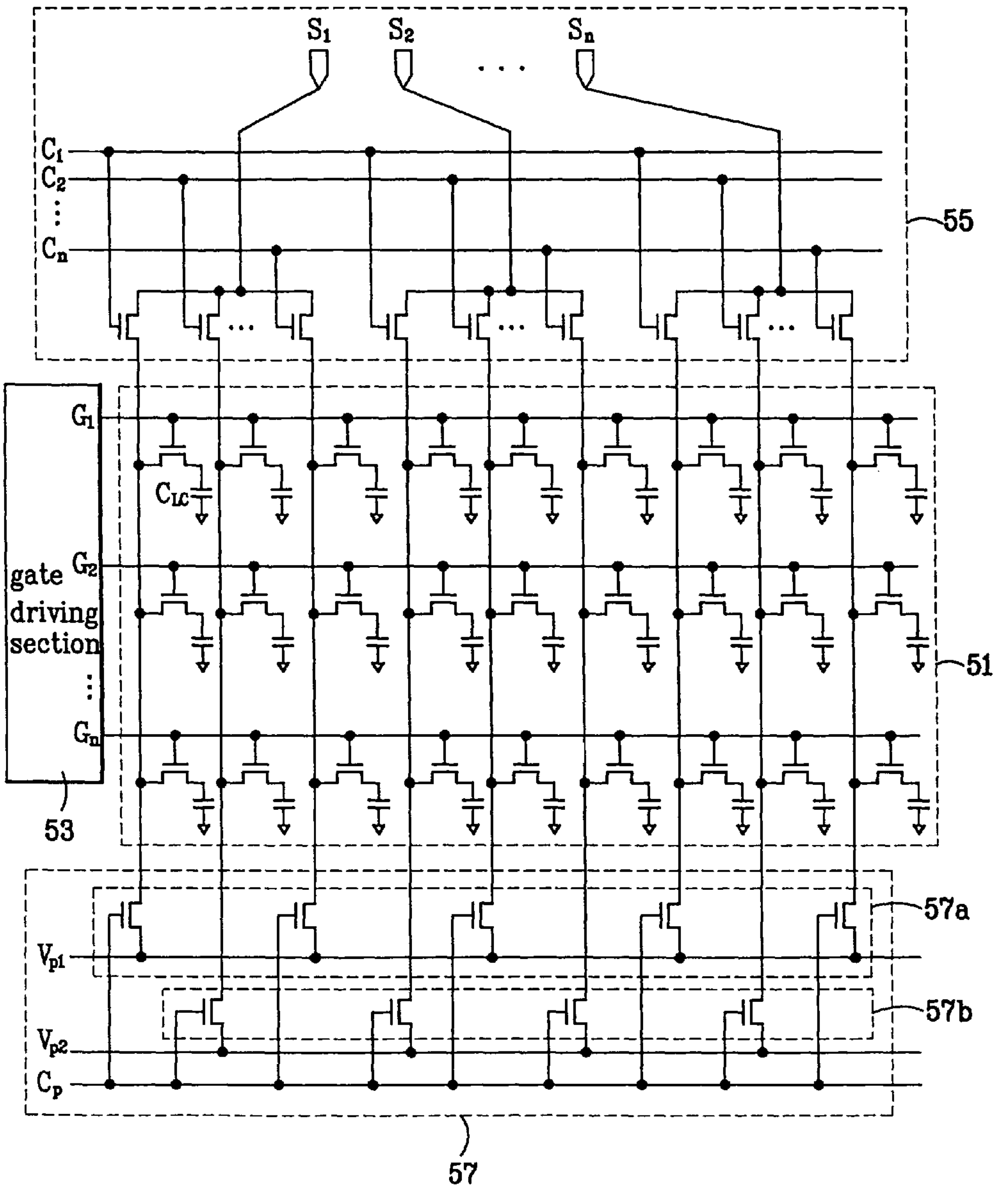
FIG. 5 is a block diagram illustrating a construction of an LCD device according to a first embodiment of the present invention.

FIG. 5 is a block diagram illustrating a construction of an LCD device according to a first embodiment of the present invention.

Referring to FIG. 5, an LCD device comprises a pixel section 51 including a plurality of gate lines G1, G2, . . . , Gn and data lines D1, D2, . . . , Dn arranged to cross each other and a plurality of thin film transistors (TFTs) and liquid crystal capacitors $C_{LC}$ formed at each crossing point, a gate driving section 53 for applying driving signals to the gate lines in order, a source driving section 55 for applying video signals S1, S2, . . . , Sn to each set of data lines in order, and a precharge circuit section 57 for supplying different precharging voltages to adjacent data lines.

Here, the precharge circuit section 57 comprises first precharging voltage terminals Vp1, second precharging voltage terminals Vp2, a first switching section 57*a* for switching the voltage of the first precharging voltage terminals Vp1 with odd number data lines D1, D3, D5, . . . , and a second switching section 57*b* for switching the voltage of the second precharging voltage terminals Vp2 with even number data lines D2, D4, D6, . . . .

Each set of the data lines are switched with the corresponding video signal lines by the thin film transistors. For instance, the first set of data lines is switched with the video signal line S1, while the second set of data lines is switched by the video signal line S2. Here, the switchability between the data lines and the video signal lines is determined by the switching control signals C1, C2, . . . , Cn.

Meanwhile, the source driving section 55 includes video signal lines corresponding to each set of data lines. Video signal line can be connected (shorted) to or separated from one another by an external control.

If the video signal lines are shorted to one another before applying the video signals to the data lines, all the data lines within the pixel section 51 are shorted to one another.

If a precharging voltage of a pre-selected level is applied to the shorted video signal lines, all the data lines are precharged to the pre-selected level.

For that purpose, it is necessary to use a voltage applying section (not shown in the drawing) to apply a precharging voltage of a pre-selected level to the shorted video signal lines.

The first switching section 57*a* and the second switching section 57*b* include thin film transistors, and their operations are determined by precharge control signals Cp. The first precharge section 57*a* and the second precharge section 57*b* may use the same or different precharge control signals for their operation.

The following is a description of a driving method of the LCD device according to the first embodiment of the present invention constructed as above.

To precharge the data lines initially, the switching control signals C1, C2, . . . Cn are concurrently activated to electrically connect the data lines and video signal lines S1, S2, . . . , Sn.

After shorting the video signal lines S1, S2, . . . , Sn to one another, a precharging voltage of a predetermined level is applied thereto. As a result, all the data lines are precharged to the predetermined level. Here, the precharging voltage of the predetermined level should be an intermediate level. For instance, assuming that the voltage of the video signals in a positive field is ranged 6-10V and the voltage of the video signals in a negative field is ranged 1-5V (the voltage range varies depending on the type of liquid crystal used), the precharging voltage of the predetermined level should be about 5.5V.

After shorting the video signal lines S1, S2, . . . , Sn of the source driving section 55 together and first precharging the data lines by applying a voltage of a predetermined level, the data lines are electrically isolated from the video signal lines S1, S2, . . . , Sn by deactivating the switching control signals C1, C2, . . . , Cn.

Thereafter, the data lines are secondly precharged by using the precharge circuit section 57. Since the data lines are precharged at about 5.5V, the voltage of the first precharging voltage terminals Vp1 is adjusted to be about 2-3V and the voltage of the second precharging voltage terminals is adjusted to be about 7-8V in a positive field.

In other words, if the first gate line G1 and the switching control signals C1, C2, . . . , Cn are activated after precharging the odd number data lines to about 2-3V and the even number data lines to about 7-8V, video signals are loaded on the even number data lines in a positive field. The video signals are loaded on the odd number data lines in a negative field.

Therefore, assuming that the voltage of the video signals is about 6-10V in a positive field, the voltage variation ΔV of the even number data lines is merely about 2-3V. Assuming that the voltage of the video signals is about 1-5V in a negative field, the voltage variation ΔV of the odd number data lines is merely about 2-3V as well.

In order to store the video signals at a corresponding pixel by activating the second gate line, the voltage of the first precharging voltage terminals Vp1 should be switched with the voltage of the second precharging voltage terminals Vp2.

The reason is because most LCD devices employ a dot inversion method, and polarities of the video signals are reversed whenever the gate lines are activated. Accordingly, it is necessary to switch the voltages between the first precharging voltage terminals Vp1 and the second precharging voltage terminals Vp2. The voltage switch can be performed by a switching operation with a simple control signal.

In short, according to the first embodiment of the present invention, the video signals S1, S2, . . . , Sn are first shorted to one another. Thereafter, the data lines are first precharged. Then, the data lines are secondly precharged by using the precharge circuit section. Therefore, the voltage variation range can be drastically narrowed in the data lines, thereby eliminating cross talks among the adjacent data lines. As a result, it is possible to prevent distortion of signals caused by voltage variation of the data lines.

Second Embodiment

The second embodiment of the present invention has a modified construction of the precharge circuit section. The precharge circuit section according to the second embodiment of the present invention has a switching element for switching the precharging voltage in a positive field and a switching element for switching the precharging voltage in a negative field connected in parallel with respect to each data line.

The second embodiment of the invention does not require any external switches for switching voltages between the first precharging voltage terminals and the second precharging voltage terminals even if the polarities of the video signals loaded on each data line are reversed as each gate line is activated.

Figure 6:
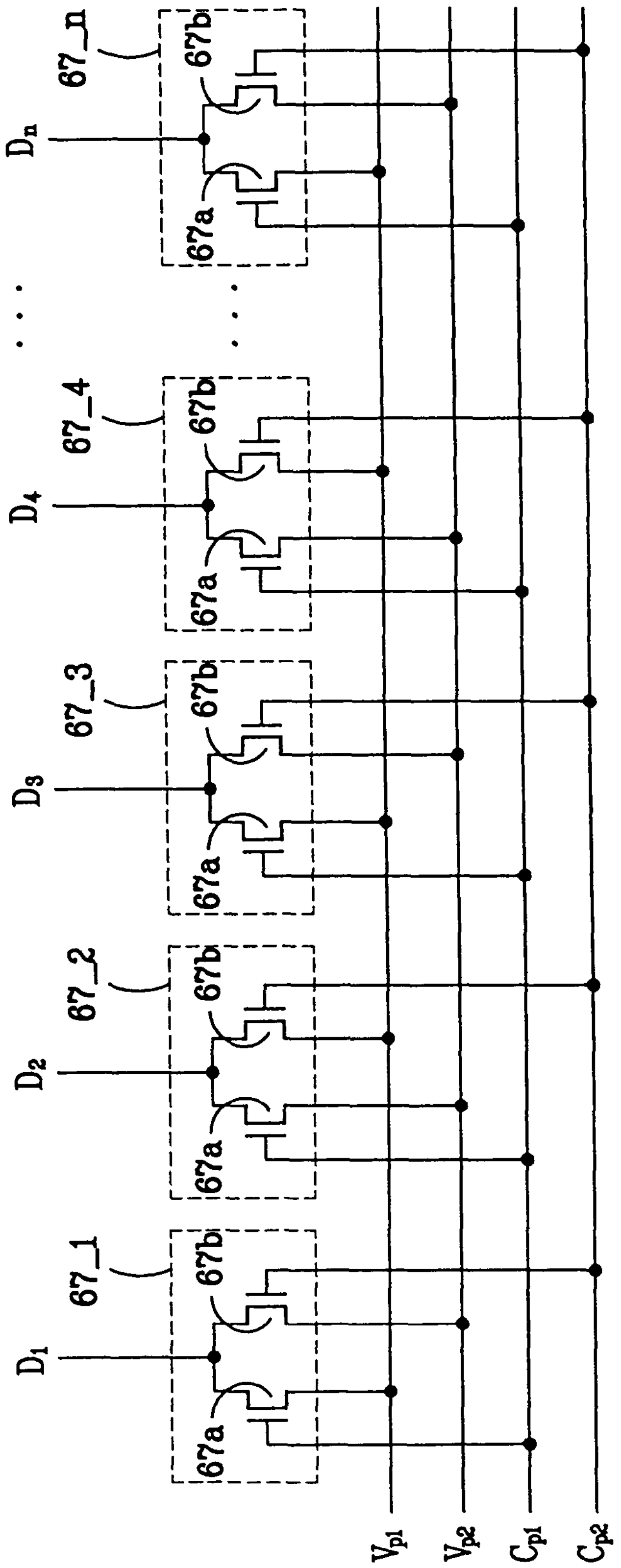
FIG. 6 is a block diagram illustrating a precharge circuit section of the LCD device according to a second embodiment of the present invention.

FIG. 6 is a block diagram illustrating a precharge circuit section of the LCD device according to a second embodiment of the present invention.

Referring to FIG. 6, the precharge circuit section 67 incudes switching sections 67_1, 67_2, . . . , 67_*n* connecting first switching elements 67*a* and second switching elements 67*b* to each data line. The first and second switching elements 67*a* and 67*b* have output terminals connected in common, but with different input sources.

In the odd number data lines, either the first precharging voltage Vp1 is applied through the first switching elements 67*a* in accordance with the first precharge control signal Cp1, or the second precharging voltage Vp2 is applied through the second switching elements 67*b* in accordance with the second precharge control signal Cp2.

In the even number data lines, either the second precharging voltage Vp2 is applied through the first switching elements 67*a* in accordance with the first precharge control signal Cp1, or the first precharging voltage Vp1 is applied through the second switching elements 67*b* in accordance with the second precharge control signal Cp2.

Here, the voltage of the first precharging voltage terminals Vp1 is ranged to be about 2-3V, while the voltage of the second precharging voltage terminals Vp2 is ranged to be about 7-8V. (However, the voltage ranges vary depending on the kind of liquid crystal used.)

Figure 7:
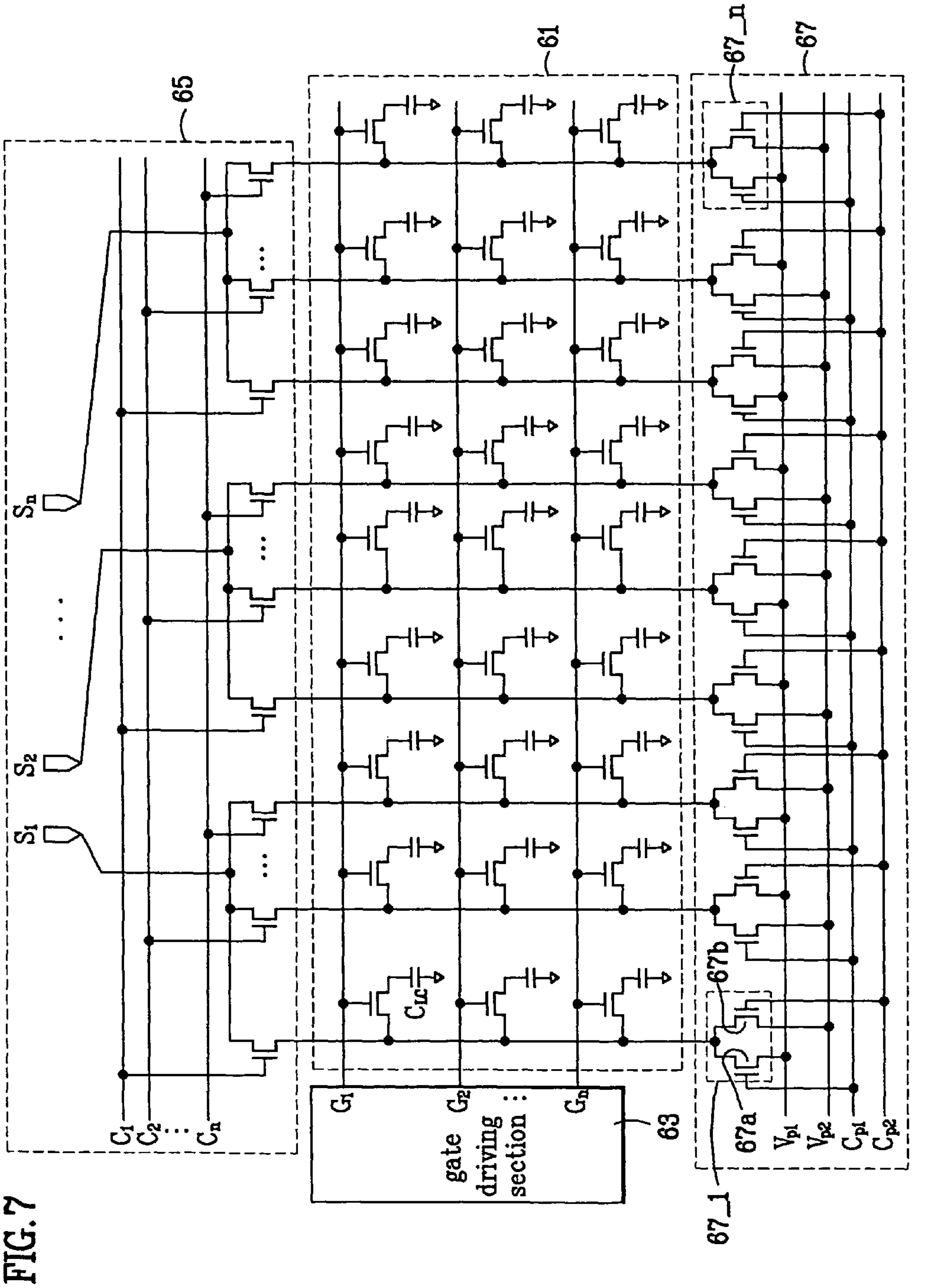
FIG. 7 is a block diagram illustrating a construction of the LCD device according to the second embodiment of the present invention.

FIG. 7 is a block diagram illustrating a construction of the LCD device according to the second embodiment of the present invention.

Referring to FIG. 7, the LCD device includes a pixel section 61 composed of a plurality of gate lines G1, G2, . . . , Gn and data lines D1, D2, . . . , Dn crossing each other to have thin film transistors TFTs and liquid crystal capacitors $C_{LC}$ formed at each crossing point, a gate driving section 63 for applying driving signals to the gate lines in order, a source driving section 65 for applying video signals S1, S2, . . . , Sn to each set of data lines in order, and a precharge circuit section 67 connected to each data line for alternating the precharging voltages of high level and low level so that the voltages are switched with each data line.

Here, the precharge circuit section 67 includes first precharging voltage terminals Vp1 and second precharging voltage terminals Vp2 for alternately applying either one of the voltages of the first precharging voltage terminals Vp1 and the second precharging voltage terminals Vp2 to a data line in accordance with the first precharge control signals Cp1 and the second precharge control signal Cp2. The odd number data line and the even number data line are precharged with different voltages.

The precharge circuit section 67 includes switching sections 67_1, 67_2, . . . , **67_*n* each composed of the first switching elements 67*a* and the second switching elements 67*b*** connected in parallel to each data line. The switching elements are composed of thin film transistors of an identical conductive type.

Each set of data lines are connected to the corresponding video signal line by the thin film transistors. For instance, the first set of data lines are connected to the video signal line S1, while the second set of data lines are connected to the video signal line S2. Here, the connection between the data lines and the video signal lines is determined by the switching control signals C1, C2, . . . , Cn.

The source driving section 65 includes the video signal lines S1, S2, . . . , Sn corresponding to the sets of data lines. Each video signal line can be connected together (i.e., shorted to one another) or separated by an external control.

Accordingly, if the video signal lines are shorted to one another before applying the video signals to the data lines, the respective data lines within the pixel section 61 become shorted together.

Here, if a precharging voltage of a predetermined level is applied to the shorted video signal lines, all the data lines are precharged to the predetermined level.

To this end, a precharging voltage applying section (not shown in the drawing) is used for applying the precharging voltage of a predetermined level to the shorted video signal lines.

Here, the high-level precharging voltage is higher than the voltage precharged by the source driving section, while the low-level precharging voltage is lower than the voltage precharged by the source driving section.

The following is a description of a driving method of the LCD device according to the second embodiment of the present invention.

To first precharge the data lines, the switching control signals C1, C2, . . . , Cn are simultaneously activated, and the data lines are electrically connected to the video signal lines S1, S2, . . . , Sn.

Then, the video signals S1, S2, . . . , Sn are shorted to one another, and a precharging voltage of a predeterrnined level is applied thereto so that all the data lines can be precharged to the predetermined level. Here, the precharging voltage of the predetermined level should be an intermediate voltage between the voltage of the video signals in a positive field and the voltage of the video signals in a negative field. For instance, assuming that the voltage of the video signals in a positive field is ranged 6-10V and the voltage of the video signals in a negative field is ranged 1-5V, the precharging voltage of the predetermined level should be about 5.5V.

After shorting the video signals S1, S2, . . . , Sn of the source driving section 65 to one another, the data lines are first precharged by applying the precharging voltage of the predetermined level. Subsequently, the switching control signals C1, C2, . . . , Cn are deactivated to electrically isolate the data lines from the video signal lines S1, S2, . . . , Sn.

Then, the data lines are secondly precharged by using the precharging circuit 67. For reference, the data lines are currently in a precharged state at about 5.5V.

The voltage of the first precharging voltage terminals Vp1 is fixed to be about 2-3V, and the voltage of the second precharging voltage terminals Vp2 is fixed to be about 7-8V.

If the first precharge control signals Cp1 are activated thereafter, the odd number data lines are precharged with the voltage of the first precharging voltage terminals Vp1, while the even number data lines are precharged with the voltage of the second precharging voltage terminals Vp2.

If the first gate line and the switching control signals C1, C2, . . . , Cn are activated at this stage, the video signals are loaded on the even number data lines precharged at about 7-8V in a positive field, and the video signals are loaded on the odd number data lines precharged at 2-3V in a negative field.

Therefore, assuming that the voltage of the video signals is about 6-10V in a positive field, the voltage variation of the even number data lines is merely about 2-3V. Assuming that the voltage of the video signals is 1-5V in a negative field, the voltage variation of the odd number data lines is merely about 2-3V as well.

Figure 8A:
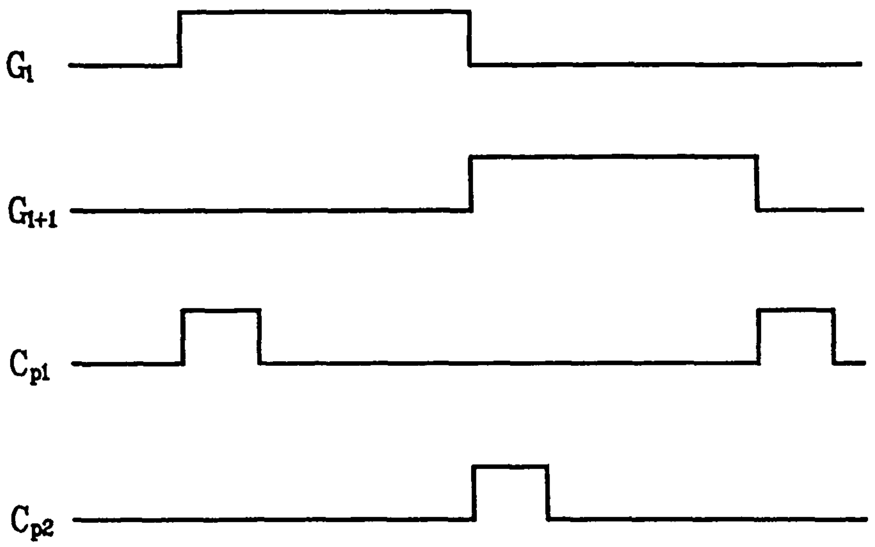
FIGS. 8A and 8B are driving waveforms illustrating a driving method of the LCD device according to the second embodiment of the present invention.

In order to activate the second gate line and the switching control signals C1, C2, . . . , Cn and to transfer video signals to the corresponding pixel electrode, the first precharge control signals Cp1 are inactivated, and the second precharge control signals Cp2 are activated as shown in FIG. 8A.

Accordingly, the odd number data lines are precharged at the voltage of the second precharging voltage terminals Vp2, while the even number data lines are precharged at the voltage of the first precharing voltage terminals Vp1.

Here, the video signals are loaded on the odd number data lines precharged at the voltage of about 7-8V in a positive field, and the video signals are loaded on the even number data lines precharged at the voltage of about 2-3V.

In short, assuming that the voltage of the video signals is 6-10V in a positive field, the voltage variation of the even number data lines is merely about 2-3V. Assuming that the voltage of the video signals is about 1-5V in a negative field, the voltage variation of the odd number data lines is merely about, 2-3V as well.

Figure 8B:
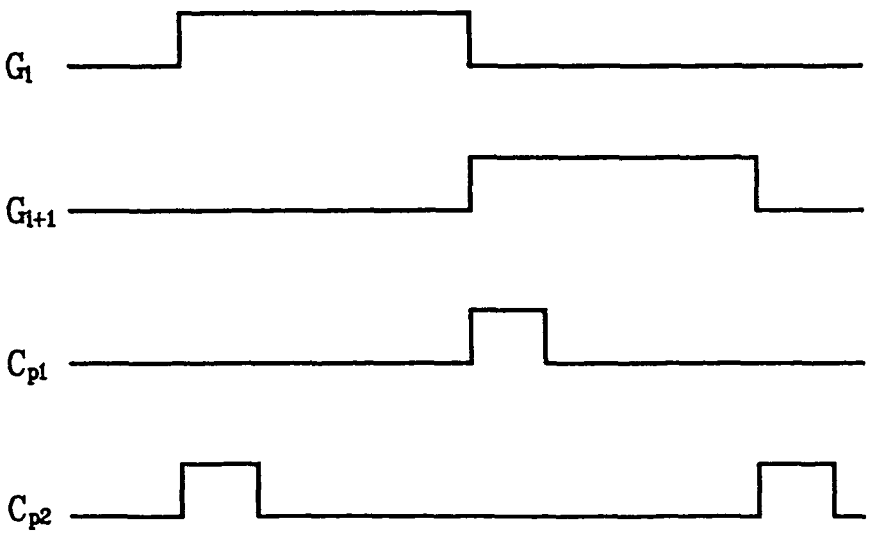

Further, activation timing of the first precharge control signals Cp1 is switched with that of the second precharge control signal Cp2. The first precharge control signal Cp1 and the second precharge control signal Cp2 are alternately activated for every horizontal scan line (gate line) as shown in FIGS. 8A and 8B.

According to the second embodiment of the present invention as described above, the video signals S1, S2, . . . , Sn are shorted to one another to first precharge the data lines. The data lines are then secondly precharged by means of the precharge circuit section. Therefore, voltage variation range in the data lines is drastically narrowed, thereby reducing the cross-talks among the adjacent data lines.

Third Embodiment

The third embodiment of the present invention has a further modified construction of the precharge circuit section. The precharge circuit section according to the second embodiment employs the first switching element and the second switching element that are commonly connected to the data lines and composed of thin film transistors of an identical conductive type. In comparison, the precharging circuit section according to the third embodiment employs the first switching element and the second switching element composed of film transistors of opposite conductive types.

Figure 9:
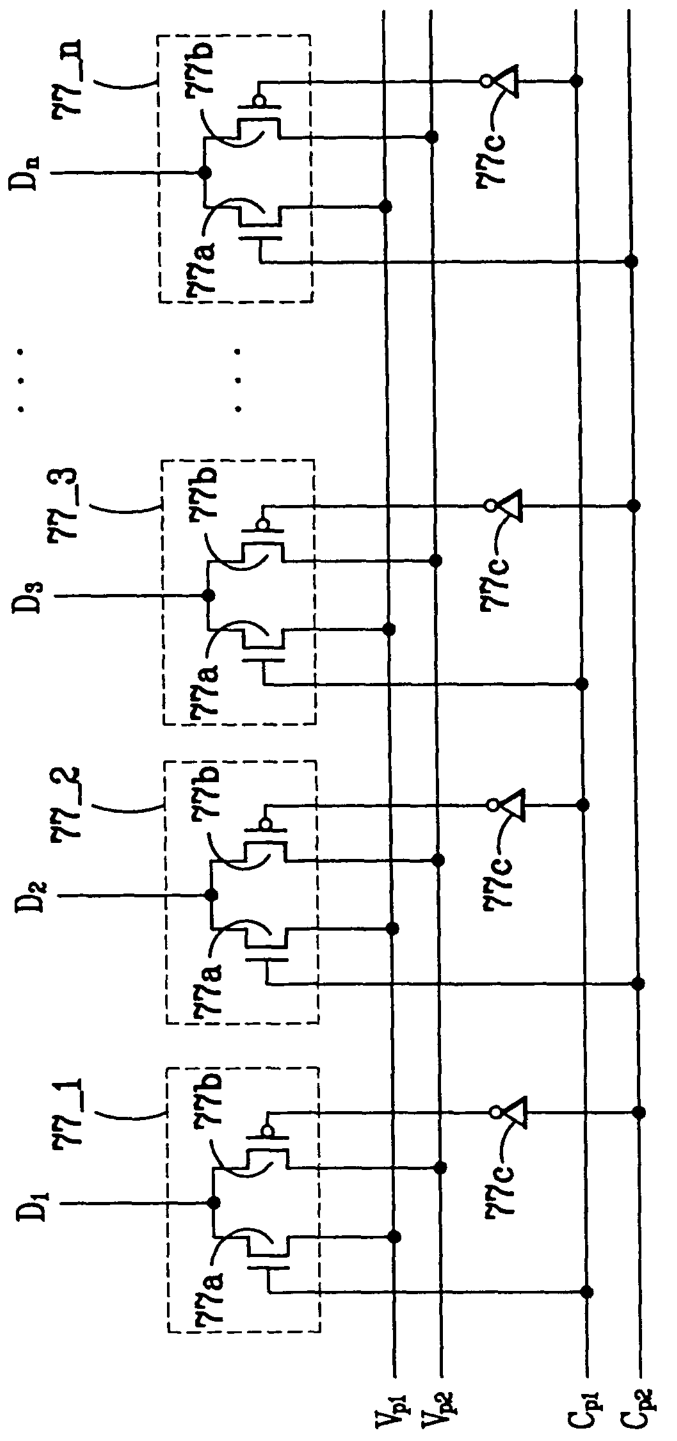
FIG. 9 is a block diagram illustrating a construction of the precharge circuit section of the LCD device according to a third embodiment of the present invention.
Figure 10:
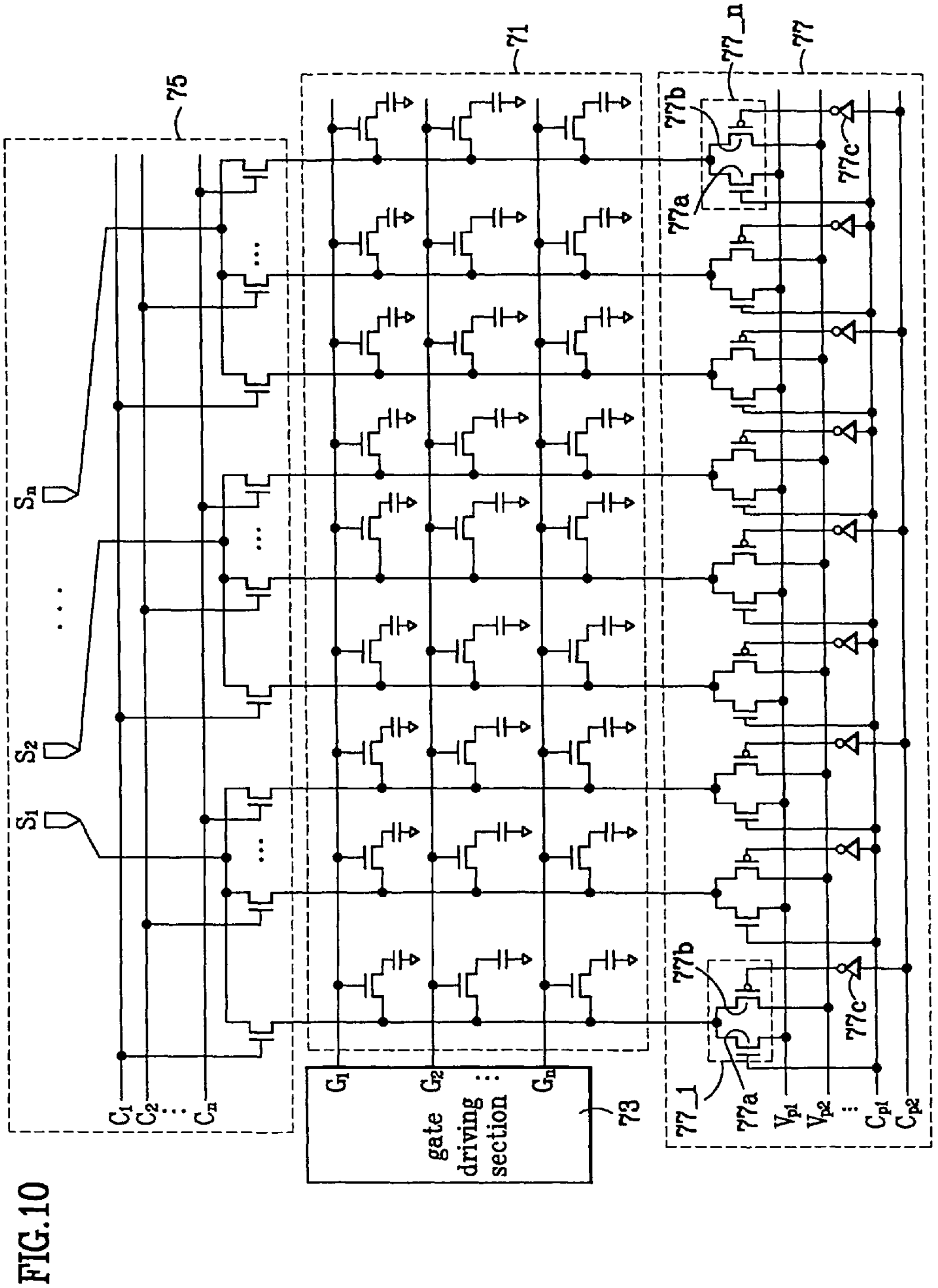
FIG. 10 is a block diagram illustrating a construction of the LCD device according to the third embodiment of the present invention.

FIG. 9 is a block diagram illustrating a construction of the precharge circuit section of the LCD device according to the third embodiment of the present invention. FIG. 10 is a block diagram illustrating a construction of the LCD device employing the precharge circuit section in FIG. 9 according to the third embodiment of the present invention.

The precharge circuit section according to the third embodiment of the present invention includes switching sections 77_1, 77_2, . . . , and 77-*n*, each connected to a data line and comprising first switching elements 77*a* formed of thin film transistors of an N conductive type and second switching elements 77*b* formed of thin film transistors of a P conductive type.

Here, the first switching elements 77*a* connected to the odd number data lines switch the voltage of the first precharge voltage terminals Vp1 by means of the first precharge control signal Cp1, while the second switching elements 77*b* switch the voltage of the second precharge voltage terminals vp2 by means of an inversion signal of the second precharge control signal Cp2.

The first switching elements 77*a* connected to the even number data lines switch the voltage of the first precharge voltage terminals Vp1 by means of the second precharge control signal Cp2, while the second switching elements 77*b* switch the voltage of the second precharge voltage terminals Vp2 by means of an inversion signal of the first precharge control signal Cp1.

Here, the second switching elements 77*b* connected to each data line receive output signals of inverters 77*c*, which invert the corresponding precharge control signal.

The first switching elements 77*a* are composed of thin film transistors of an N conductive type, while the second switching elements 77*b* are composed of thin film transistors of a P conductive type.

The precharge circuit section described above applies a high precharging voltage in a positive field, by means of the thin film transistors of a P conductive type, and a low precharging voltage in a negative field, by means of the thin film transistors of an N conductive type.

Thus, the size of the thin film transistors can be optimized and the driving voltage can be subsequently lowered by selectively using the thin film transistors of a P conductive type and an N conductive type according to the respective voltage level.

FIG. 10 is a block diagram illustrating a construction of the LCD device employing the precharge circuit section in FIG. 9 according to the third embodiment of the present invention.

Referring to FIG. 10, the LCD device according to the third embodiment includes a pixel section 71 having a plurality of gate lines G1, G2, . . . , Gn and data lines D1, D2, . . . , Dn crossing each other to have thin film transistors TFTs and liquid crystal capacitors $C_{LC}$ formed at each crossing point, a gate driving section 73 for applying driving signals to the gate lines in order, a source driving section 75 for applying video signals S1, S2, . . . , Sn to each set of data lines in order, and a precharge circuit section 77 including first precharging voltage terminals Vp1 and second precharging voltage terminals Vp2, and switching sections (not shown) for switching a high precharging voltage in a positive field with a low precharging voltage in a negative field for each data line by means of separate switching elements.

Here, the odd number data lines and the even number data lines are precharged with different voltages.

The precharge circuit section 71 includes switching sections 77_1, 77_2, . . . , 77_*n* each composed of first switching elements 77*a* and second switching elements 77*b* connected in parallel for each data line. The switching elements are composed of thin film transistors of opposite conductive types.

Here, the first switching elements 77*a* are thin film transistors of an N conductive type, while the second switching elements 77*b* are thin film transistors of a P conductive type. The second switching elements 7*b* are operated by output signals of inverters 77*c*, which invert the corresponding precharge control signals.

Each set of data lines are connected to the corresponding video signal lines by the film transistors. For instance, the first set of data lines are connected to the video signal line S1, while the second set of data lines are connected to the video signal line S2. Here, the connection between the data lines and the video signal lines is determined by the switching control signals C1, C2, . . . , Cn.

Meanwhile, the source driving section 75 comprises video signal lines S1, S2, . . . , Sn corresponding to each set of data lines. Each video signal line can be shorted or disconnected from one another by an external control.

If the video signal lines are shorted from one another before applying the video signals to the data lines, all the data lines within the pixel section 71 are shorted to one another.

If a precharging voltage of a predetermined level is applied to the shorted video signal lines, all the data lines are precharged to the predetermined level.

For that purpose, a voltage applying section (not shown in the drawing) is used to apply a precharging voltage of a predetermined level to the shorted video signal lines.

The following is a description of a driving method of the LCD device according to the third embodiment of the present invention constructed as above.

To first precharge the data lines, the switching control signals C1, C2, . . . , Cn are simultaneously activated, and the data lines are electrically connected to the video signal lines S1, S2, . . . , Sn.

Then, the video signals S1, S2, . . . , Sn are shorted to one another, and a precharging voltage of a predetermined level is applied thereto so that all the data lines can be precharged to the predetermined level. Here, the precharging voltage of the predetermined level should be an intermediate voltage between the voltage of the video signals in a positive field and the voltage of the video signals in a negative field. For instance, assuming that the voltage of the video signals in a positive field is ranged 6-10V and the voltage of the video signals in a negative field is ranged 1-5V, the precharging voltage of the predetermined level should be about 5.5V.

After shorting the video signals S1, S2, . . . , Sn of the source driving section 75 to one another, the data lines are first precharged by applying the precharging voltage of the predetermined level. Subsequently, the switching control signals C1, C2, . . . , Cn are deactivated to electrically isolate the data lines from the video signal lines S1, S2, . . . , Sn.

Then, the data lines are secondly precharged by using the precharging circuit 77. For reference, the data lines are currently in a precharged state at about 5.5V.

The voltage of the first precharging voltage terminals Vp1 is fixed to be about 2-3V, and the voltage of the second precharging voltage terminals Vp2 is fixed to be about 7-8V.

Thereafter, if the first precharge control signals Cp1 are activated to a high level and the second precharge control signals Cp2 are activated to a low level, the voltage of the first precharging voltage terminals Vp1 is applied to the odd number data lines through the first switching elements 77*a*, and the voltage of the second precharge voltage terminals Vp2 is applied to the even number data lines through the second switching elements 77*b*.

Here, if the first gate line and the switching control signals C1, C2, . . . , Cn are activated, video signals are loaded in the even number data lines precharged at the voltage of about 7-8V in a positive field, and video signals are loaded in the odd number data lines precharged at the voltage of about 2-3V in a negative field.

Therefore, assuming that the voltage of the video signals is about 6-10V in a positive field, the voltage variation of the even number data lines is merely about 2-3V. Assuming that the voltage of the video signals is about 1-5V in a negative field, the voltage variation of the odd number data lines is merely about 2-3V as well.

In order to activate the second gate line and the switching control signals C1, C2, . . . , Cn and to transfer video signals to the corresponding pixel electrode, the first precharge control signals Cp1 should be deactivated to a low level, and the second precharge control signals Cp2 should be activated to a high level.

Therefore, the voltage of the second precharging voltage terminal Vp2 is applied to the odd number data lines through the second switching elements 77*b*, and the voltage of the first precharging voltage terminal Vp1 is applied to the even number data lines through the first switching elements 77*a*.

Here, the video signals are loaded on the odd number data lines precharged at about 7-8V in a positive field, and the video signals are loaded on the even number data lines precharged at about 2-3V in a negative field.

Therefore, assuming that the voltage of the video signals is about 6-10V in a positive field, the voltage variation of the even number data lines is merely about 2-3V. Assuming that the voltage of the video signals is 1-5V in a negative field, the voltage variation of the odd number data lines is merely 2-3V as well.

Figure 11A:
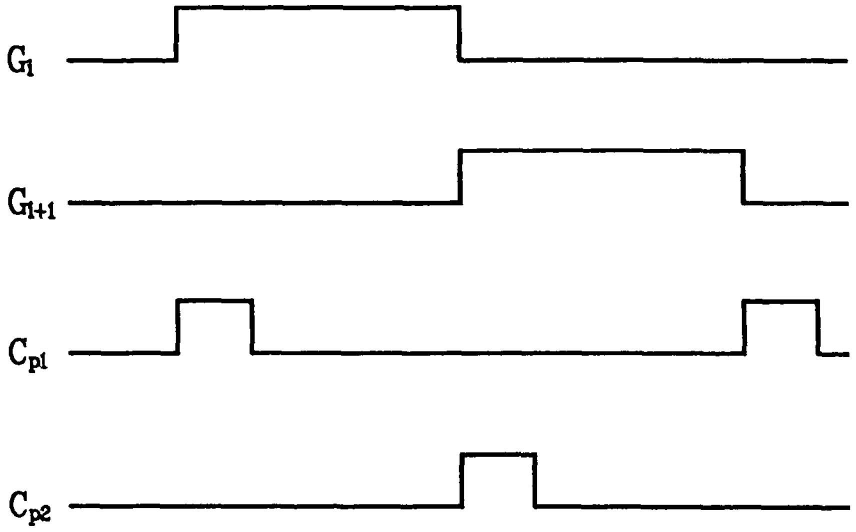
FIGS. 11A and 11B are driving waveforms illustrating a driving method of the LCD device according to the third embodiment of the present invention.
Figure 11B:
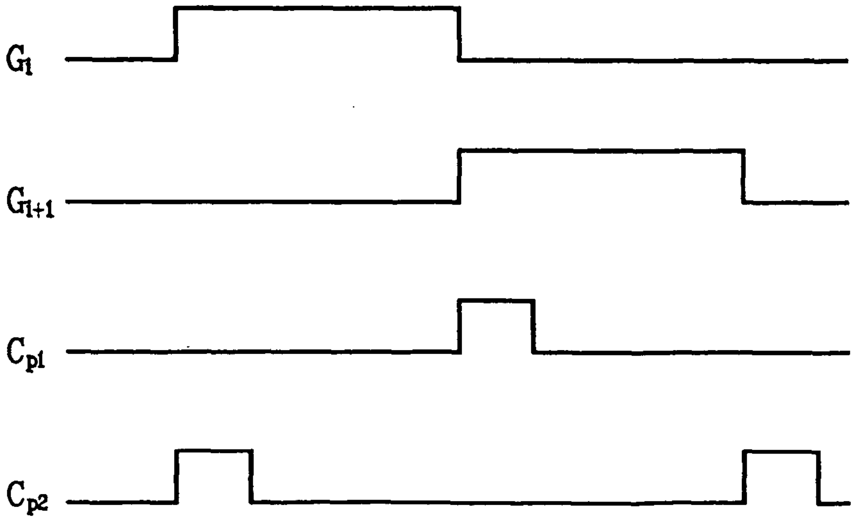

In the third embodiment of the present invention constructed as above, activation timing of the first precharge control signals Cp1 is switched with that of the second precharge control signal Cp2. Also, the first precharge control signal Cp1 and the second precharge control signal Cp2 are alternately activated for every horizontal scan line (gate line) as shown in FIGS. 11A and 11B.

According to the third embodiment of the present invention, the video signal lines S1, S2, . . . , Sn are shorted to one another to first precharge the data lines. The data lines are secondly precharged by using the precharge circuit section 77. The high-level precharging voltage in a positive field is applied to the data lines by means of the thin film transistors of a P conductive type, while the low-level precharging voltage in a negative field is applied to the lines by means of the thin film transistors of an N conductive type.

As described above, the LCD device and a method for driving the same according to the present invention have the following advantages.

First, distortion of video signals caused by signal coupling between adjacent data lines can be prevented by precharging the data lines multiple times and by minimizing the range of voltage variation of the data lines.

Second, the precharging voltage required in a positive field can be more easily switched with the precharging voltage required in a negative field.

Third, size and driving voltage of the switching elements can be reduced by employing the switching elements of an optimal size according to the level of the precharging voltage.

It will be apparent to those skilled in the art that various modifications and variations can be made in the liquid crystal display device and method for driving the same of the present invention without departing from the spirit or scope of the invention. Thus, it is intended that the present invention cover modifications and variations of this invention provided they come within the scope of the appended claims and their equivalence.

What is claimed as:

1. A liquid crystal display (LCD) device having a first substrate and a second substrate with liquid crystal sealed therebetween, comprising:

a plurality of gate lines and data lines crossing each other on the first substrate;

a gate driving section for driving the gate lines;

a source driving section for precharging all the data lines with a first precharging voltage by applying the first precharging voltage to the all the data lines for a first precharging time and supplying video signals to the data lines for a time applying the video signals, wherein the video signals include negative and positive video signals; and a precharge circuit section for further precharging adjacent data lines with different voltages by applying second and third precharging voltages to the adjacent data lines, respectively, for a second precharging time between the first precharging time and the time applying the video signals, wherein, in the first precharging time, the source driving section shorts all the data lines together and applying the first precharging voltage to all the data lines, wherein the first precharging voltage is an intermediate voltage between the negative and positive video signals, wherein, in the second precharging time after the first precharging time, the precharge circuit section applies the second precharging voltage lower than the first precharging voltage and a third precharging voltage higher than the first precharging voltage to the adjacent data lines among all the data lines, which were precharged with the first precharging voltage in the first precharging time, wherein, in the time applying the video signals, the source driving section applies the negative and positive video signals to the adjacent data lines, respectively, precharged with the second and third precharging voltages, respectively, wherein all the data lines are divided to a plurality of data line sets, and the source driving section includes a plurality of video signal lines which are respectively connected with the plurality of data line sets via a plurality of switching transistors, and wherein the plurality of video signal lines are shorted to one another and the plurality of switching transistors are concurrently activated, so that all the data lines are shorted to one another.

2. The LCD device of claim 1, wherein the data lines include odd and even number data lines and wherein the precharge circuit section comprises:

first precharging voltage terminals for applying the second precharging voltage;

second precharging voltage terminals for applying the third precharging voltage;

first switching sections including first thin film transistors for connecting the odd number data lines and the first precharging voltage terminals; and second switching sections including second thin film transistors for connecting the even number data lines and the second precharging voltage terminals.

3. The LCD device of claim 2, wherein the first switching section and the second switching section are operated by different precharge control signals.

* * * * *